(12) United States Patent
Lam

(10) Patent No.: US 9,546,068 B2
(45) Date of Patent: Jan. 17, 2017

(54) GUIDED TAPE APPLICATOR

(71) Applicant: LAMUS ENTERPRISES INC., Vancouver (CA)

(72) Inventor: Joe Augustine S. T. Lam, Vancouver (CA)

(73) Assignee: LAMUS TECHNOLOGIES INC., Vancouver, BC (CA)

( * ) Notice: Subject to any disclaimer, the term of this patent is extended or adjusted under 35 U.S.C. 154(b) by 23 days.

(21) Appl. No.: 14/666,571

(22) Filed: Mar. 24, 2015

(65) Prior Publication Data

US 2016/0280499 A1  Sep. 29, 2016

(51) Int. Cl.
*B65H 35/00* (2006.01)

(52) U.S. Cl.
CPC .... *B65H 35/0033* (2013.01); *F16M 2200/061* (2013.01); *F16M 2200/063* (2013.01); *Y10T 156/1788* (2015.01); *Y10T 156/1795* (2015.01)

(58) Field of Classification Search
CPC .... B65C 11/002; B65C 11/004; B29C 70/388; Y10T 156/1788; Y10T 156/1795; B32B 38/1808; F16M 2200/061
See application file for complete search history.

(56) References Cited

U.S. PATENT DOCUMENTS

| | | | |
|---|---|---|---|
| 2,700,524 A | 1/1955 | Lauterbach | |
| 3,005,898 A * | 10/1961 | Rosenthal | B29C 65/38 156/279 |
| 3,238,080 A | 3/1966 | Schulter | |
| 3,598,683 A | 8/1971 | Butler | |
| 3,856,251 A * | 12/1974 | Miller | F16M 11/10 248/205.1 |
| 4,166,602 A | 9/1979 | Nilsen | |
| 4,926,760 A * | 5/1990 | Sack | B66F 7/0666 108/145 |
| 5,163,270 A * | 11/1992 | Treiber | B65B 67/10 53/136.1 |
| 5,660,676 A * | 8/1997 | Brooks | B65C 9/1869 156/361 |

(Continued)

FOREIGN PATENT DOCUMENTS

| | | | | |
|---|---|---|---|---|
| CH | GB 191229936 A * | 12/1913 | | F16M 11/38 |
| FR | 2554800 A1 * | 5/1985 | | B60R 11/04 |

OTHER PUBLICATIONS

International Search Report/Written Opinion for PCT/CA2016/050114 Dated Mar. 16, 2016.

*Primary Examiner* — Mark A Osele

(57) ABSTRACT

A tape applicator system that employs an extendable arm to carry and control the movement of a tape applicator mounted at its moveable or free end. The tape is dispensed from a essentially fixed location remote from the applicator which permits the use of larger roll (Machine rolls) without the necessitating moving the roll as is required in a normal hand operated device. The movement of the tape applicator mounted on the arm is restricted to straight line movement by the linkage of the extendable arm. If desired a parallel linkage mechanism may be used in the arm to maintain the angular orientation of the applicator which is particularly important when the tape applicator is a common tape head normally use in taping machines. Using a constant height system the height of the tape applicator can be maintained constant when in operation.

11 Claims, 3 Drawing Sheets

(56) References Cited

U.S. PATENT DOCUMENTS

| | | |
|---|---|---|
| 7,325,777 B2 | 2/2008 | Thiessen |
| 8,360,524 B2 * | 1/2013 | Deml .................... B60N 2/502 248/421 |
| 2011/0272101 A1 | 11/2011 | Schilling |

* cited by examiner

GUIDED TAPE APPLICATOR

CROSS REFERENCE TO RELATED APPLICATIONS

Not applicable

STATEMENT REGARDING FEDERALLY SPONSORED RESEARCH OR DEVELOPMENT

Not applicable

REFERENCE TO MICROFICHE APPENDIX

Not Applicable.

FIELD OF INVENTION

The present invention relates to a manual or power assisted device that may be used to facilitate the application of a tape having pressure sensitive adhesive on one face, in a straight line to an object.

BACKGROUND OF THE PRESENT INVENTION

The use of pressure sensitive tape is and has been for many years very common in the packaging industries. The tape being applied is usually dispensed from a tape roll. There are two main categories of tape roll sizes available, namely;
1. For use in manual tape application with a tape dispenser or hand applicator which is restricted in the size and weight as required for ease of handling are generally classified as "Hand rolls" and have a roll size that will usually provide about 100 meters tape length
2. For automatic tape application by a taping machine equipped with a tape head the tape rolls generally referred to as "Machine rolls" have a roll size that will provide from 1000 to 2000 meters of tape.

The Machine roll has significant advantage over Hand roll based on the 10 to 1 ratio in tape length tape as roll replenishment is reduced by a factor of at least 9 times thereby reducing production down time. The larger roll also results in more consistent taping performance since most taping problems occurred towards the end or depletion of the roll i.e. when the diameter of the roll has been significantly reduced. The cost per linear length of the tape is also reduced when the Machine roll is used as opposed to the Manual roll as the number of paper cores is used is significantly reduced and both the manufacturing and the shipping costs are reduced.

It is estimated 50 percent packaging tape consumers are restricted to Hand rolls since an automatic taping machine is not feasible for their particular operations. In spite of the economic advantages of the much larger Machine rolls, purchasing and using an automatic taping machine is not justifiable for taping operations that tape less than about 500 cartons a day and automatic taping machines do not lend themselves to intermittent production and/or different sizes of cartons to be taped. Furthermore automatic taping machines require a conveyor to transport the carton through a stationery tape applicator generally referred to as a tape head that applies tape dispensed from a station tape roll and requires a significant amount of space. Manual taping generally applies tape to a stationery carton by manually moving a hand applicator with a Hand roll (as required to ensure the hand applicator is not too heavy to maneuvered manually) and lends itself to do the operations that are not economically or easily accomplished by automatic machines.

Manual tape applicators as currently know in addition to requiring the more expensive tape (per lineal meter of tape) are also, to a significant degree, limited by the dexterity of the operator for alignment, accuracy and speed of application. The present invention alleviates many of the short comings of the manual applicators

BRIEF DESCRIPTION OF THE PRESENT INVENTION

It is an objective of the present invention to provide a tape applicator mounting and guiding device that can guide the movement of the tape applicator and facilitate manual operation in that it can carry a significant amount of the weight of the applicator.

It is an objective of the present invention to permit the use of a Machine roll in manual tape application without the effect of the weight of the heavy Machine tape roll having to be borne by the operator by delivering tape dispensed from a stationery supported tape roll to a tape applicator for applying tape onto an object.

Broadly the present invention relates to a taping device comprising a base, a tape roll mounting for mounting a tape roll on said base for rotation about a tape roll axis, an extendable arm comprising at least two links, each said link of said at least two links having a first end and a second end remote from said first end, a first link of said at least two links, a first pivotal mounting mounting said first link and thereby said extendable arm on said base for rotation about a first axis positioned adjacent to a first end of said first link, a second link of said at least two links, a pivotable interconnection interconnecting said first and second links adjacent to said second end of said first link and said first end of said second link for rotation about an interconnecting axis, a tape applicator, an applicator mounting mounting said tape applicator to said arm adjacent to a second end of a link of said at least two links remote from said base and providing a free end of said arm, and guide rolls mounted on said arms and said base to define a at least a portion of a tape path between said tape roll mounted on said tape roll mounting and said tape applicator, said tape roll axis, said first axis, said interconnecting axis and axes of rotation of said guide roll all being parallel, said free end of said arm being moveable between an extended position remote from said base and a collapsed position adjacent to said base via relative movement between said first and second links to move said tape applicator in a substantially straight line for applying said tape to an object.

Preferably, the taping device may further include a first and a second parallel link each having a first end and a second end remote from said first end and each having a length corresponding to lengths of said first and second links respectively, a first parallel link pivotal mounting mounting said first parallel link on said base for rotation about a first parallel link axis positioned adjacent to a first end of said first link, said first parallel link pivotable mounting being spaced a selected distance from said first pivotal mounting, a second pivotable interconnection interconnecting said first and second parallel links adjacent to said second end of said first parallel link and said first end of said second parallel link for rotation about a second interconnecting axis, a interconnecting link interconnecting said first and second pivotable interconnections, a second interconnecting link pivotably interconnecting said second ends of said second link and said second parallel link, said selected length and length of said first and second interconnecting links being essentially the same length and combining with said first and second links and said first and second parallel links to form a parallel link mechanism.

Preferably the guide rolls will be positioned one adjacent to at least one said first or second ends of each of said links of said at least two links.

Preferably the taping device will further comprise a parallel movement linkage comprising a lever arm having one end slidably connected to said frame for movement along a fixed straight path, a control link having opposite ends, a first pivotable connection pivotably connecting one of said opposite ends to said lever adjacent to a second end of said lever remote from said one end and a second pivotable connection pivotably connecting another of said opposite ends to said control link to said second link midway of said second link, a third pivotable connection pivotably connecting said lever to said first link adjacent to the mid points of said lever and of said first link, the rotational axis of each of said first, second and third pivotable connections being parallel and parallel to said first axis.

In some cases the taping device will further comprise a parallel movement linkage comprising a lever having one end slidably connected to said frame for movement along a fixed straight path, a connecting link having opposite ends, a first pivotable connection pivotably connecting one of said opposite ends to said lever adjacent to a second end of said lever remote from said one end and a second pivotable connection pivotably connecting another of said opposite ends to a selected one of said second link or said second parallel link midway of said second link or second parallel link, a third pivotable connection pivotably connecting said lever to a selected one of said first link or said first parallel link adjacent to the mid points of said lever and said selected first or first parallel link, the rotational axis of each of said first, second and third pivotable connections being parallel and parallel to said first axis.

Preferably the taping device may include a supporting frame, a hinge connection mounting said base on said supporting frame for rotational movement on a hinge axis perpendicular to said first axis. Preferably the taping device may include a supporting frame that includes a first supporting frame link rotatably connected adjacent to one end of said support link to a base frame on a first connector, a second supporting frame link one end of said second supporting fame link rotatably connected to said first supporting frame link adjacent to an end of said first supporting frame link remote from said one end of said first supporting frame link via a second connector and said hinge connection connecting said base to said second supporting frame link, rotational axes of said first and second connectors and said hinge axis being substantially parallel.

BRIEF DESCRIPTION OF THE SEVERAL VIEWS OF THE DRAWINGS

Further features, objects and advantages will be evident from the following detailed description of the preferred embodiments of the present invention taken in conjunction with the accompanying drawings in which.

DETAILED DESCRIPTION OF THE INVENTION

Figure 1:
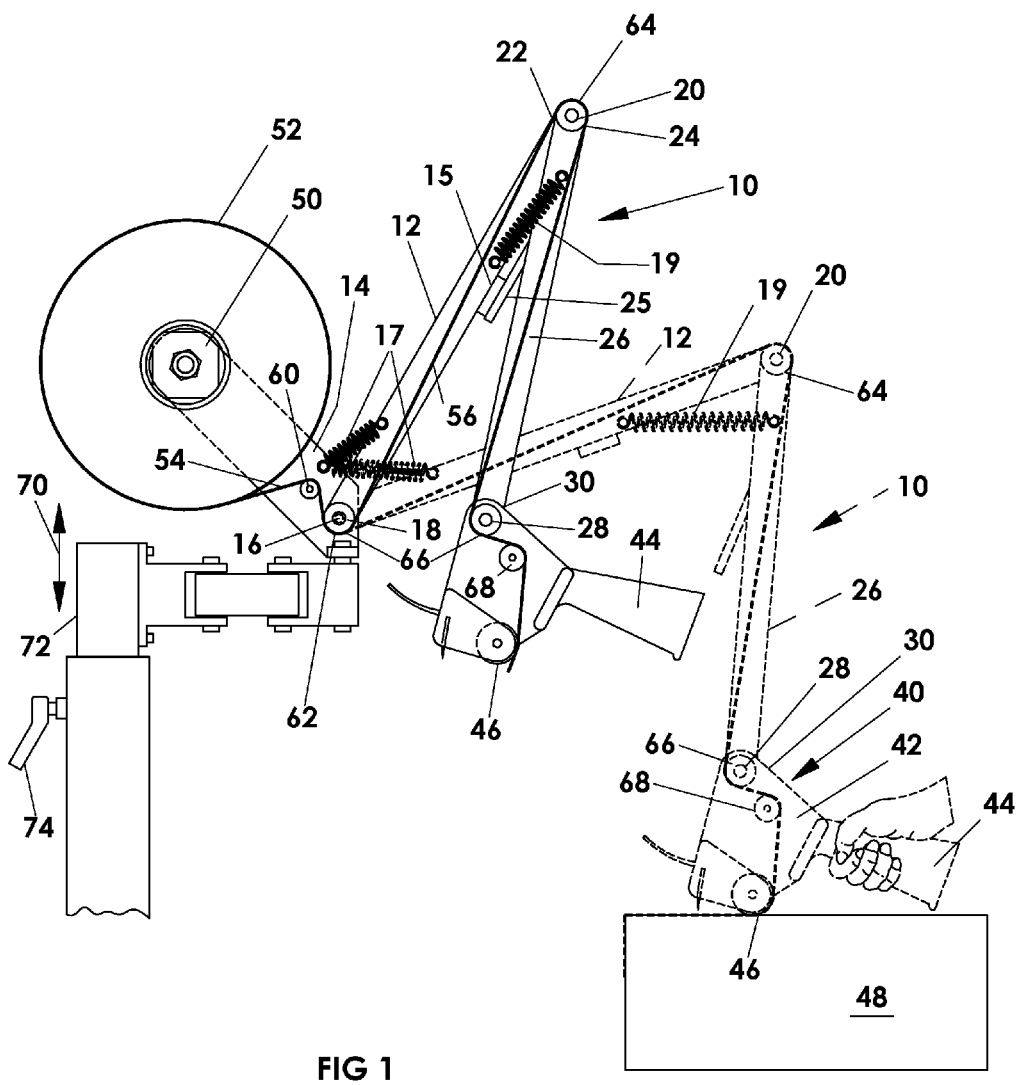
FIG. 1 shows an schematic elevation view illustration of one embodiment the current invention with solid lines showing the arm with a taping devise at one end at its normal home position and in dotted line the taping devise pulled away from the home position into a operative position for applying tape onto an object such as the carton illustrated.

FIG. 1 shows one embodiment of the present invention with the extensible arm 10 shown in solid lines in a retracted home position and in dash lines in an extended operative position. A first link 12 of the arm 10 is pivotably mounted at to a base 14 adjacent to a first end 16 of the link 12 via a pivotable mounting 18 having a pivotal axis around which the first link may be pivoted relative to the base 14. A pivotable interconnection 20 interconnects a second end 22 of the first link 10 with a first end 24 of a second link 26 of the arm 10 for relative rotational movement of the first and second links around an interconnecting axis formed thereby. Pivotably mounted on a rotatable applicator connection 28 at the free end of the arm 10 as defined in the illustrated embodiment by the second end 30 of the second link 26 is a hand tape applicator in the form of a hand tape applicator 40 the frame 42 of which is rotatably connected at 28 to the second end 30 of link 26. If more links are used to the end of the link forming a free end of the arm 10 i.e. end remote from the base 14.

The tape applicator 40 may be of any suitable applicator design; the illustrated version has a frame 42, with a handle 44 projecting there from in a position to be grasped and manipulated by the operator.

It will be apparent that the arm 10 particularly the free end thereof as defined by the second end 30 of the link 26 in the illustrated arrangement of FIG. 1 is controlled to move in an essentially straight line to guide the operator to apply tape along a straight line as is required in most box taping operations.

Preferably magnetic elements 15 and 25 will be connected one to the arm 12 and the other to arm 26 and will hold together when in close proximity to tend to hold the arm 10 in the retracted home position shown in solid lines in FIG. 1. The spring 17 that extends between the base 14 and link 12 and spring 19 that extends between the links 12 and 26 bias the arm 10 to the retracted home position shown in solid lines in FIG. 1.

It is important for ease of operation and to permit the use of the tape rolls that are Machine rolls size as opposed to the smaller Manual roll that the tape source not have to be manipulated by the operator when applying the tape as occurs with manually operated tape applicators. This is accomplished with the present invention by providing a tape roll mounting 50 on the base 14 and is shown with a tape roll 52 from which the tape 54 that is to be applied to an object 48 as will be described below. A tape path 56 from the roll 52 to the applicator roll 46 of the applicator 40 is defined by a plurality of spaced guide rolls (60, 62, 64 66 an 68) over which the tape passes en route from the roll 52 to the applicator roll 46. The tape passes from the tape roll 52 to a guide roll 60 mounted on the base 14, then in the illustrated embodiment to the guide roll 62 to the guide roll 64, then to the guide roll 66, over the guide roll 68 mounted on the applicator frame 42 to the applicator roll 46 for application to an object such as the box 48. In the illustrated versions the guide rolls are shown concentric with the pivotal mounting, however to minimize the change in length as the links are relatively rotated these guide rolls should be as small as possible in diameter or preferably moved to a position adjacent to but offset from the pivot points It will be apparent that the adhesive side of the tape being applied will contact some of the guide rolls namely the rolls 62 and 66 and to minimize problems these rolls will have knurled surfaces. Also to better control the free end of the tape when it is cut after a taping operation the roll 66 will preferably be a one way clutch roll permitting movement of the tape 54 toward the applicator roll 46 while inhibiting movement in the opposite direction.

In operation the embodiment illustrated with the applicator 40 (manual applicator) the operator positions the box 48 relative to the arm 10 so that the movement of the arm will preferably be parallel to the side edge 49 of the box 48 (see FIG. 2) and the centre line on which the tape is to be applied aligned with the line of movement of the arm 10 so that when the tape is applied by the operator using the hand applicator in the normal manner the tape will be applied in a straight line as desired.

Obviously boxes and/or objects come in different heights thus the height of the base 14 is adjustable as schematic indicated by the arrow 70 via he telescoping posts 72 that is lockable by the lever 74.

Figure 2:
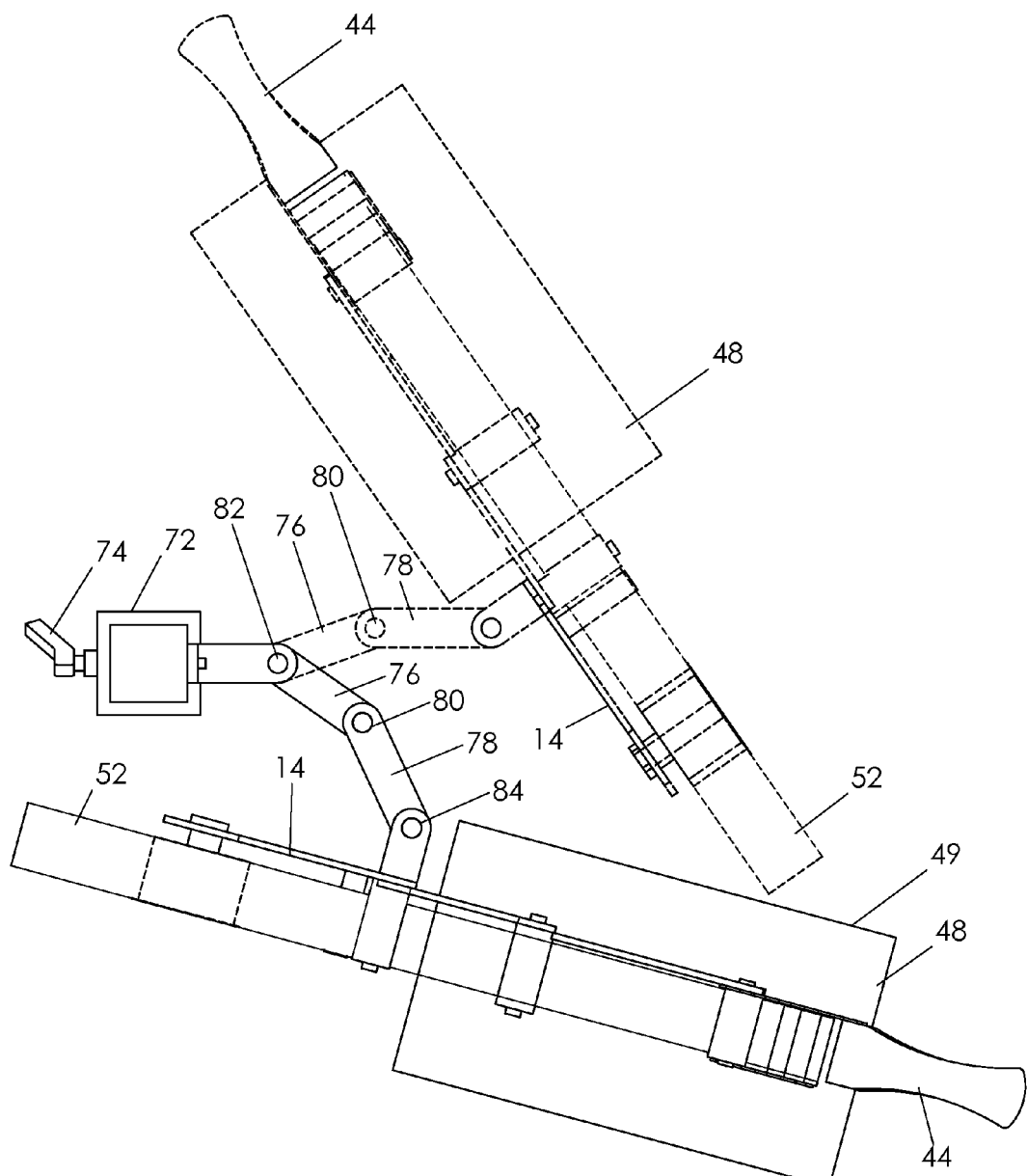
FIG. 2 is a view looking down on the invention and illustrating a system for horizontal positioning of the device with the solid line illustration showing the device aligned to apply tape on a stationery object or carton positioned at a first angle and a dotted line position where the devise is aligned to apply tape on a stationery carton at a second angle.

FIG. 2 illustrates a mounting for the base 14 that facilitates aligning the path of travel of the arm 10. As illustrated a plurality hinge supporting links 76 and 78 hinges together as indicated at 80 one of which 76 is hinged to the supporting post 72 as indicated at 82 and the other 78 to the base 14 as indicated at 84 to thereby provide a supporting frame for the base 14 and thus the arm 10. The swing axes of the hinges are parallel to the post 72 and perpendicular to the rotation axes for example of the guide rolls 64, 64 and 66. As is apparent by the difference in position illustrated by the dash lines and by the solid lines the orientation of the line of movement of the arm 10 as defined by the links 12 and 26 can easily be varied significantly.

Figure 3:
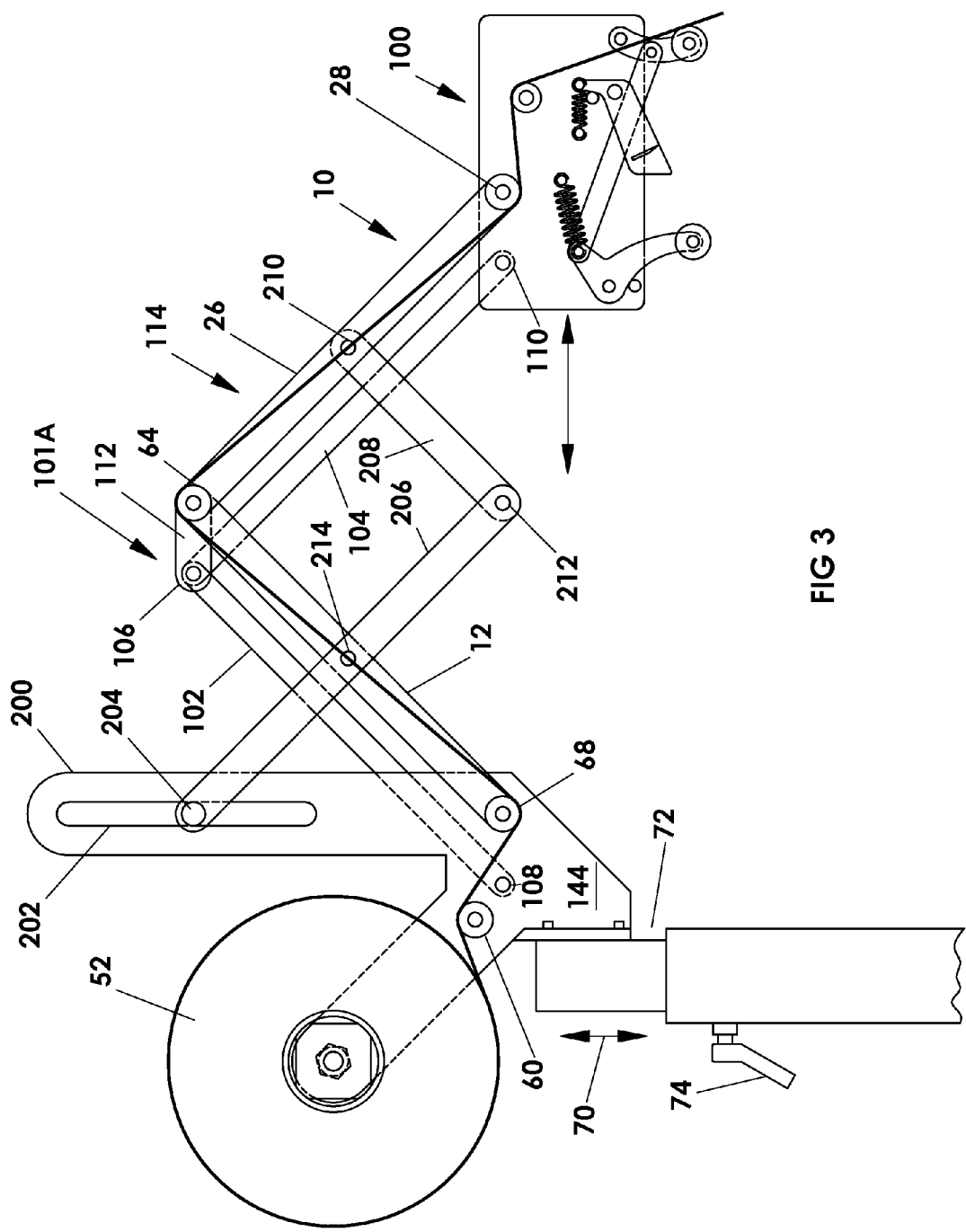
FIG. 3 is a side elevation illustrating a modified form of the arm of the present invention that incorporates a parallel link mechanism to control movement and orientation of a tape head mounted at the free end thereof.

FIG. 3 shows a modified form of the invention that is particularly suited to mounting a tape head 100 (mechanical tape applicator as opposed to a manual tape applicator) on the free end of the arm 10. In this embodiment a second pair of links i.e. a first parallel link 102 and a second parallel 104 link are mounted and interconnected in the same manner as the links 12 and 26 to each other at 106 and to the base 144 as indicated at 108 and tape applicator in this case tape head 100 as indicated at 110 to in effect form a second arm 101A. The interconnection 20 is connected to the interconnection 106 between the links 102 and 104 by a connecting link 112. This combination of the links 12, 26 with the links 102 and 104 their respective connections to the base 144 and to the applicator 100 and the interconnecting link 112 forms a parallel link mechanisms that insures that the orientation of the tape head 100 is constant i.e. it will normally be horizontal as it would normally be in taping machines of the type these heads 100 are normally incorporated in. The spacing between the pivotal mounting 16 and 106 on the base 144 and between the connections 28 and 110 on the tape head 100 and the effective length of the connecting link 112 are essentially the same to provide the parallel link i.e the base 144 and the tape head 100 each in effect forms a link of the parallel link mechanism.

In some cases it may be desirable particularly where a tape head 100 is being used that not just the orientation of the head 100 be controlled but also the height of the head 100 be preset by adjustment of the post 72 and lock 74 and so the both the orientation and height of the head 100 remain constant as the head 100 traverses an object to be taped such as the box 48 in FIG. 1. This is accomplished in the present invention by a constant height mechanism that is provided by modifying the base 144 and provide an arm 200 with a substantially vertically extending slot 202 that provides a cam track in which a cam roller 204 at one end of a lever 206 is received and is guided thereby. A control link 208 has one of its ends pivotably connected to the midpoint of the second lever 26 as indicated at 210 and its opposite end pivotably connected to the lever 206 at its end remote from the roller 204 as indicated at 212.

The mid points of the link 12 and lever 206 are pivotably interconnected as indicated at 214.

This arrangement with the slot 202 vertical i.e. parallel to the post 74 ensures that the free end of the arm 10 moves is a horizontal plane i.e. perpendicular to the post 74. It will be apparent that the lever 206 and link 208 could be connected as described to the links 102 and 104 instead of links 12 and 26.

It will be apparent that the constant height mechanism may be applied to the FIG. 1 embodiment by adding the elements 200 to 214 to that system.

It will be evident that if desired a motor assist may be used to move the arms 10 and/or 101A as per the FIGS. 1 and 3 embodiments.

Having described the invention, modifications will be evident to those skilled in the art without departing from the scope of the invention as defined in the appended claims.

I claim:

1. A taping device comprising a base, a tape roll mounting for mounting a tape roll on said base for rotation about a tape roll axis, an extendable arm comprising at least two links, each said link of said at least two links having a first end and a second end remote from said first end, a first link of said at least two links, a first pivotal mounting mounting said first link and thereby said extendable arm on said base for rotation about a first axis positioned adjacent to a first end of said first link, a second link of said at least two links, a pivotable interconnection interconnecting said first and second links adjacent to said second end of said first link and said first end of said second link for rotation about an interconnecting axis, a tape applicator, an applicator mounting mounting said tape applicator to said arm adjacent to a second end of a link of said at least two links remote from said base and providing a free end of said arm, and guide rolls mounted on said arms one adjacent to at least one of said first or second ends of each of said links of said at least two links and on said base to define at least a portion of a tape path between said tape roll mounted on said tape roll mounting and said tape applicator, said tape roll axis, said first axis, said interconnecting axis and axes of rotation of said guide roll all being parallel, said free end of said arm being moveable between an extended position remote from said base and a collapsed position adjacent to said base via relative movement between said first and second links to move said tape applicator in a substantially straight line for applying said tape to an object, a supporting frame, a hinge connection mounting said base on said supporting frame for rotational movement on a hinge axis perpendicular to said first axis.

2. The taping device as defined in claim 1 further comprising a first and a second parallel link each having a first end and a second end remote from said first end and each having a length corresponding to lengths of said first and second links respectively, a first parallel link pivotal mounting mounting said first parallel link on said base for rotation about a first parallel link axis positioned adjacent to a first end of said first link, said first parallel link pivotable mounting being spaced a selected distance from said first pivotal mounting, a second pivotable interconnection interconnecting said first and second parallel links adjacent to said second end of said first parallel link and said first end of said second parallel link for rotation about a second interconnecting axis, a first interconnecting link interconnecting said first and second pivotable interconnections, a second interconnecting link pivotably interconnecting said second ends of said second link and said second parallel link, said selected length and length of said first and second interconnecting links being essentially the same length and combining with said first and second links and said first and second parallel links to form a parallel link mechanism.

3. The taping device as defined in claim 2 wherein said second interconnecting link is formed by a frame of a tape head and wherein said tape head is said tape applicator.

4. The taping device as defined in claim 3 further comprising a parallel movement linkage comprising a lever arm having one end slidably connected to said frame for movement along a fixed straight path, a control link having opposite ends, a first pivotable connection pivotably connecting one of said opposite ends to said lever adjacent to a second end of said lever remote from said one end and a second pivotable connection pivotably connecting another of said opposite ends to said control link to said second link midway of said second link, a third pivotable connection pivotably connecting said lever to said first link adjacent to the mid points of said lever and of said first link, the rotational axis of each of said first, second and third pivotable connections being parallel and parallel to said first axis.

5. The taping device as defined in claim 4 wherein said supporting frame includes a first supporting frame link rotatably connected adjacent to one end of said support link to a base frame on a first connector, a second supporting frame link one end of said second supporting frame link rotatably connected to said first supporting frame link adjacent to an end of said first supporting frame link remote from said one end of said first supporting frame link via a second connector and said hinge connection connecting said base to said second supporting frame link, rotational axes of said first and second connectors and said hinge axis being substantially parallel.

6. The taping device as defined in claim 2 further comprising a parallel movement linkage comprising a lever arm having one end slidably connected to said frame for movement along a fixed straight path, a control link having opposite ends, a first pivotable connection pivotably connecting one of said opposite ends to said lever adjacent to a second end of said lever remote from said one end and a second pivotable connection pivotably connecting another of said opposite ends to said control link to said second link midway of said second link, a third pivotable connection pivotably connecting said lever to said first link adjacent to the mid points of said lever and of said first link, the rotational axis of each of said first, second and third pivotable connections being parallel and parallel to said first axis.

7. The taping device as defined in claim 6 wherein said supporting frame includes a first supporting frame link rotatably connected adjacent to one end of said support link to a base frame on a first connector, a second supporting frame link one end of said second supporting frame link rotatably connected to said first supporting frame link adjacent to an end of said first supporting frame link remote from said one end of said first supporting frame link via a second connector and said hinge connection connecting said base to said second supporting frame link, rotational axes of said first and second connectors and said hinge axis being substantially parallel.

8. The taping device as defined in claim 2 wherein said supporting frame includes a first supporting frame link rotatably connected adjacent to one end of said support link to a base frame on a first connector, a second supporting frame link one end of said second supporting frame link rotatably connected to said first supporting frame link adjacent to an end of said first supporting frame link remote from said one end of said first supporting frame link via a second connector and said hinge connection connecting said base to said second supporting frame link, rotational axes of said first and second connectors and said hinge axis being substantially parallel.

9. The taping device as defined in claim 1 further comprising a parallel movement linkage comprising a lever arm having one end slidably connected to said frame for movement along a fixed straight path, a control link having opposite ends, a first pivotable connection pivotably connecting one of said opposite ends to said lever adjacent to a second end of said lever remote from said one end and a second pivotable connection pivotably connecting another of said opposite ends to said control link to said second link midway of said second link, a third pivotable connection pivotably connecting said lever to said first link adjacent to the mid points of said lever and of said first link, the rotational axis of each of said first, second and third pivotable connections being parallel and parallel to said first axis.

10. The taping device as defined in claim 9 wherein said supporting frame includes a first supporting frame link rotatably connected adjacent to one end of said support link to a base frame on a first connector, a second supporting frame link one end of said second supporting frame link rotatably connected to said first supporting frame link adjacent to an end of said first supporting frame link remote from said one end of said first supporting frame link via a second connector and said hinge connection connecting said base to said second supporting frame link, rotational axes of said first and second connectors and said hinge axis being substantially parallel.

11. The taping device as defined in claim 1 wherein said supporting frame includes a first supporting frame link rotatably connected adjacent to one end of said support link to a base frame on a first connector, a second supporting frame link one end of said second supporting frame link rotatably connected to said first supporting frame link adjacent to an end of said first supporting frame link remote from said one end of said first supporting frame link via a second connector and said hinge connection connecting said base to said second supporting frame link, rotational axes of said first and second connectors and said hinge axis being substantially parallel.

* * * * *